E. G. FISHER.
VALVE.
APPLICATION FILED DEC. 31, 1912.
1,089,756.
Patented Mar. 10, 1914.
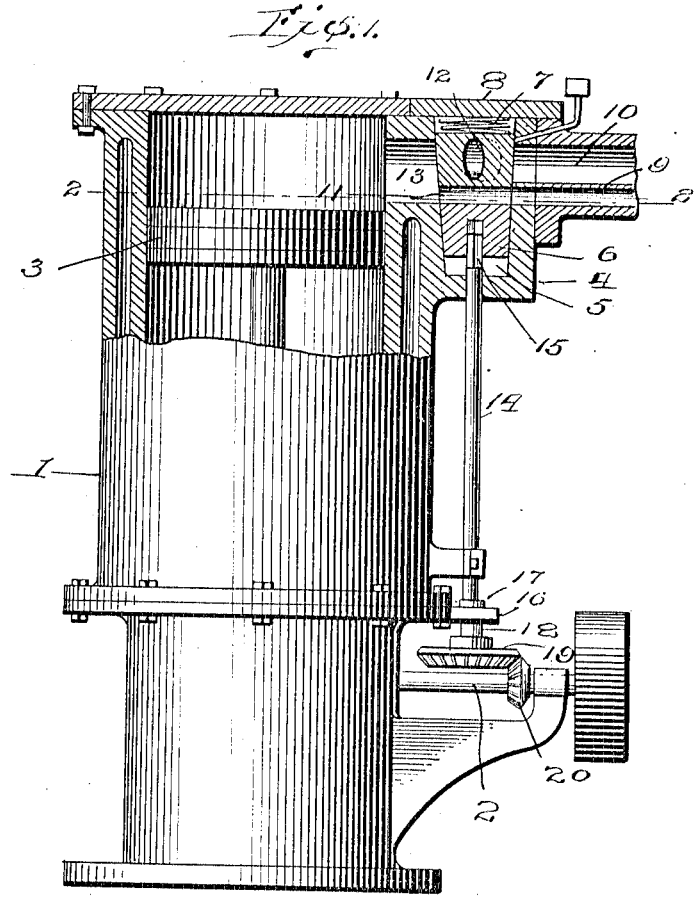
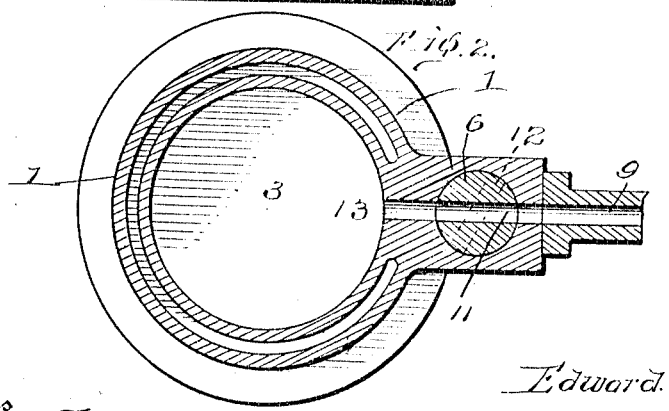
Witnesses
J. M. Fowler Jr.
Chas. F. Flory
Inventor
Edward G. Fisher
By Carey S. Frye
Attorney

UNITED STATES PATENT OFFICE.

EDWARD G. FISHER, OF WASHINGTON, DISTRICT OF COLUMBIA.

VALVE.

1,089,756.     Specification of Letters Patent.     Patented Mar. 10, 1914.

Application filed December 31, 1912. Serial No. 739,499.

*To all whom it may concern:*

Be it known that I, EDWARD G. FISHER, a citizen of the United States, residing at Washington, District of Columbia, have invented certain new and useful Improvements in Valves; and I do hereby declare the following to be a full, clear, and exact description of the invention, such as will enable others skilled in the art to which it appertains to make and use the same.

My invention relates to new and useful improvements in valves and more particularly to that class adapted to be used in connection with internal combustion engines and my object is to provide a rotary valve and so arrange the intake and exhaust ports therein as to enable the piston within the engine to make the proper strokes between the opening and closing of said ports.

A further object is to form the valve tapered or conical and arrange a spring to direct pressure thereon, whereby any wear on the valve will be compensated for, and, a further object is to so arrange the ports and gearing controlling the valve whereby the engine shaft will make four complete revolutions to each rotation of the valve.

Other objects and advantages will be hereinafter set forth and pointed out in the following specification.

In the accompanying drawings which are made a part of this application, Figure 1 is a side elevation of a motor partly in section, showing my improved valve applied thereto, and Fig. 2 is a sectional view thereof as seen on line 2—2, Fig. 1.

Referring to the drawings in which similar reference numerals designate corresponding parts throughout the several views, 1 indicates the cylinder of the motor which may be constructed in the usual or any preferred manner; 2 is the crank shaft therefor and 3 is the piston within the cylinder.

Formed upon one side of the cylinder 1 is a valve casing 4 in which is formed a tapered seat 5 and coöperating with said seat is my improved form of valve 6, said valve being conical or tapered coincident to the tapering of the seat. The valve is of less length than the seat so as to provide for longitudinal adjustment of the valve and in order to hold the valve in proper engagement with the seat a coil spring 7 is placed between the upper end of the valve 6 and the cap 8, fitting over the upper end of the valve casing, said spring directing downward pressure upon the valve at all times.

Extending through the wall of the valve casing 4 are inlet and outlet ports 9 and 10, respectively, which communicate with inlet and outlet ports 11 and 12 extending through the valve 6, both said inlet and outlet ports 11 and 12 being so positioned as to communicate with a port 13 in the wall of the cylinder 1, said port 13 being of such dimensions as to be in the path of both the inlet and outlet ports. The ports 11 and 12 are crossed with respect to each other and the ends of the ports are in close proximity to each other so that as soon as the cylinder has exhausted the intake port will immediately turn to admit the gases into the engine.

The valve is operated from a shaft 14, the upper end of which is preferably square and enters a square socket 15 in the lower end of the valve, the socket being of greater length than the portion of the shaft entering the same so that the valve can move lengthwise for adjustment. The lower portion of the shaft 14 is extended through a bracket 16, collars 17 and 18 being placed above and below the bracket respectively to prevent longitudinal movement of the shaft 14. The lower end of the shaft 14 is provided with a bevel gear 19 which meshes with a similar gear 20 on the crank shaft 2 and by making the gear 19 substantially four times as great in diameter as the gear 20, the shaft 14 and valve connected thereto will be rotated once, while the crank shaft 2 is being rotated four times, thus successively bringing the ports 11 and 12 in position for the intake and exhaust of the engine.

In operation, supposing the valve to be set in position shown in the drawings, the piston 3 has completed its upward stroke and is ready for its downward stroke, while the inlet port 11 has turned to form communication between the ports 9 and 13 so that as the piston descends it will draw the gases into the cylinder. By the time the piston reaches the lower end of the cylinder, the inlet port 11 will have turned out of registration with the ports 9 and 13, thereby closing said port and in view of the distance between the end of the inlet port communicating with the cylinder and the end of the exhaust port farthest from the cylinder the piston will move to compress the gases in the upper end of the cylinder and will again descend to the lower end of the cylinder from the force of the exploding gases by the time the end of the port 12 has turned into registration with the outlet or exhaust port 10 and port 13. As the piston again ascends, the gaseous products within the cylinder will exhaust through the ports 12 and 10 and by the time the piston has reached its upward stroke the port 11 will have turned into registration with the ports 9 and 13, so that a new supply of gases will be drawn into the cylinder when the piston again descends. By extending the ports 11 and 12 entirely through the valve the ports are turned into registration with the ports 9 and 10 at one end and 13 at the opposite end respectively with each half revolution of the valve. It will also be seen that by crossing the ports with each other, as shown, or placing them substantially X-shaped, the piston will be permitted to make its proper upward and downward strokes while the valve is making a half revolution. It will likewise be seen that by making the valve in circular formation the usual pounding noise encountered with puppet valves will be entirely overcome and the life of the valve greatly increased and further by forming the valve in conical shape and placing the pressure spring above the same the valve will always be held properly seated and any wear thereon will be compensated for and prevent leakage. It will be further understood that although I have shown the valve as operated by means of gearing, any suitable operating mechanism may be provided and it will be further understood that, while I have shown but a single cylinder, my improved form of valve may be operated with a battery of cylinders and can be produced at a much less cost than the other forms of valve construction.

What I claim is:

1. The combination with a cylinder having a piston therein and a single port in one wall of the cylinder, of a valve casing having a tapered seat therein and a pair of ports through the wall of the casing diametrically opposite the port in the cylinder, one of the latter ports being immediately below the other, a tapered cylindrical valve within said casing and of less length than the seat, said valve having an inlet and outlet port extending transversely therethrough and intersecting its center, one immediately above the other, said ports being crossed with each other and at an angle less than a right angle, both of said ports communicating with the single port in the cylinder and separately with the ports in the casing, a cap at the upper end of the casing and a spring between the cap and end of the valve to direct pressure on the valve.

2. The combination with a cylinder, a piston, a shaft to drive the piston and a gear on the shaft, of a casing on the cylinder having a tapered seat, a tapered valve fitting the seat and of less length than the seat, said cylinder having a single port communicating with the casing, said casing having a pair of ports diametrically opposite the single port, said valve having a pair of crossed ports one immediately below the other and extending centrally through the valve, both of said crossed ports communicating with the single port in the cylinder and separately with the ports in the casing, a vertically extending shaft projecting through the lower end of the casing, the upper end thereof being square, the lower end of the valve having a square opening to receive the squared end of the shaft, the opening being greater in length than the squared portion of the shaft, and a gear at the lower end of the vertical shaft to engage the gear on the driving shaft, said latter gear being less in diameter than the gear on the vertical shaft whereby the valve will be rotated slower than the driving or crank shaft.

In testimony whereof I have signed my name to this specification in the presence of two subscribing witnesses.

EDWARD G. FISHER.

Witnesses:
CAREY S. FRYE,
THOMAS K. BERNTSON.